Aug. 26, 1930.  A. F. HICKMAN  1,774,009
SEAT
Filed April 16, 1929  2 Sheets-Sheet 1
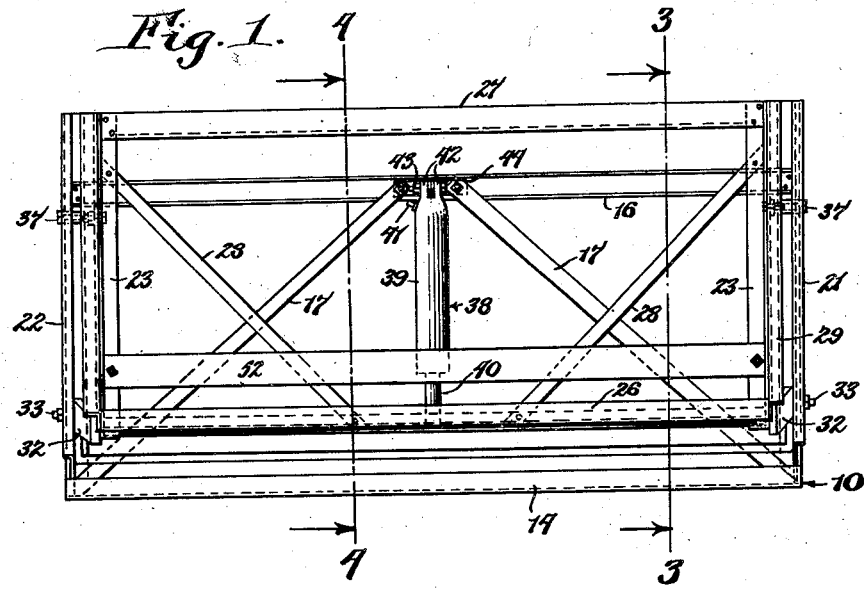
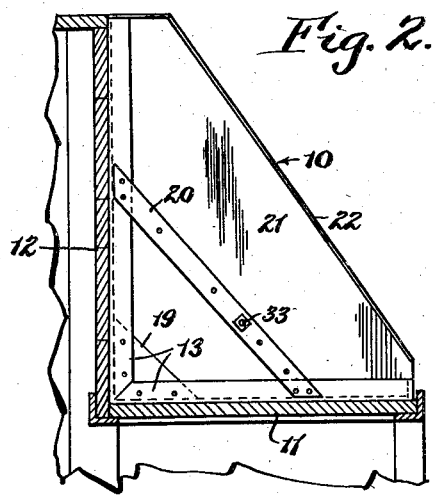
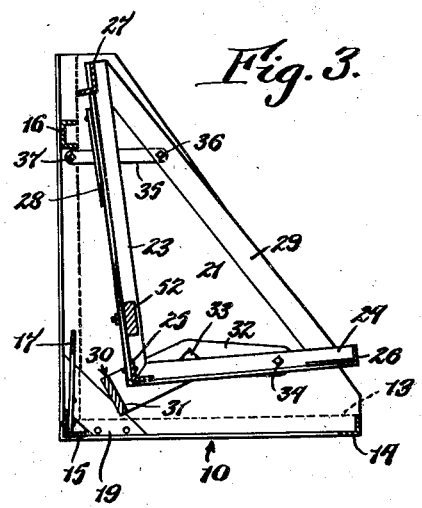
Inventor
Albert F. Hickman
By Poppt Powers
Attorneys Aug. 26, 1930.     A. F. HICKMAN     1,774,009
SEAT
Filed April 16, 1929     2 Sheets-Sheet 2

Inventor
Albert F. Hickman
By Pojep & Powers
Attorneys

Patented Aug. 26, 1930

1,774,009

UNITED STATES PATENT OFFICE

ALBERT F. HICKMAN, OF EDEN, NEW YORK, ASSIGNOR TO HICKMAN PNEUMATIC SEAT COMPANY, INC., OF EDEN, NEW YORK, A CORPORATION OF NEW YORK

SEAT

Application filed April 16, 1929. Serial No. 355,497.

This invention relates to an automobile seat and more particularly to a seat which is supported and cushioned by air so that the jars, shocks and vibrations caused by the automobile or truck passing over uneven roads are not transmitted to the driver or passengers of the vehicle. The seat forming the subject of this invention is, however, also available for use in railway cars, street cars, pleasure cars, seats provided on vibrating machinery or anywhere else that an air cushioned seat is desirable. The present invention is an improvement on the seat shown and described in my copending application, Serial No. 260,062, filed March 8, 1928.

Even with the provision of automobile shock absorbers, it has been found, especially with larger vehicles, such as automobile trucks and omnibuses that the same are extremely uncomfortable to the driver or passengers of the same, particularly when a light load is being carried, since the vibration and jars of the vehicle in passing over a rough road are not completely absorbed by the spring structure but are transmitted to the seats and render the riding or driving of the vehicle uncomfortable. Serious illnesses and permanent injury to truck drivers or others who regularly ride in such vehicles, particularly kidney trouble and other afflictions, have been directly traced to the constant vibration and jars to which the truck driver is subjected in driving his truck. To this end the present invention proposes a floating guided seat frame which is exclusively supported by a body of air under pressure so that all slight jars, shocks and vibrations are absorbed and the effect of greater jars will be cushioned and diminished and the riding of the truck thereby made comfortable and healthful.

The principal objects of this invention are to provide such a seat structure which is compact and has a movement which permits of its use in the curtailed space provided in a truck cab for such a seat, which is strong and rigid and will operate easily and smoothly for a long period of time without attention, which is relatively light in weight, and in which the moving parts are completely guarded so that there is no danger of the occupant suffering injury while riding on the same.

Another important object is to provide such a seat which can be mounted on a sub-frame in installing the seats on trucks now in use, or can be readily mounted directly on the automobile frame as a part of the standard equipment of the truck, the seat requiring but five points of suspension.

A further aim is to provide such a seat which will adequately absorb all the shocks, jars and vibrations regardless of the weight of the driver or the number of persons on the seat and is so guided in its movement that the seat rides easily and naturally without tendency to throw or jolt the occupant forwardly.

Other objects are to provide a seat of this character which is simple and inexpensive in construction and can be easily applied to the vehicle either already constructed or as a part of the equipment in assembling the vehicle.

In the accompanying drawings:

Fig. 1 is a side elevation of a seat frame carried by a sub-frame in accordance with my invention, the same being shown as stripped of upholstery, etc.

Fig. 2 is a fragmentary longitudinal section through a truck cab and showing an end elevation of the seat and sub-frame shown in Fig. 1.

Fig. 3 is a transverse section taken on line 3—3, Fig. 1.

Similar reference numerals refer to like parts in each of the several views.

Figure 4:
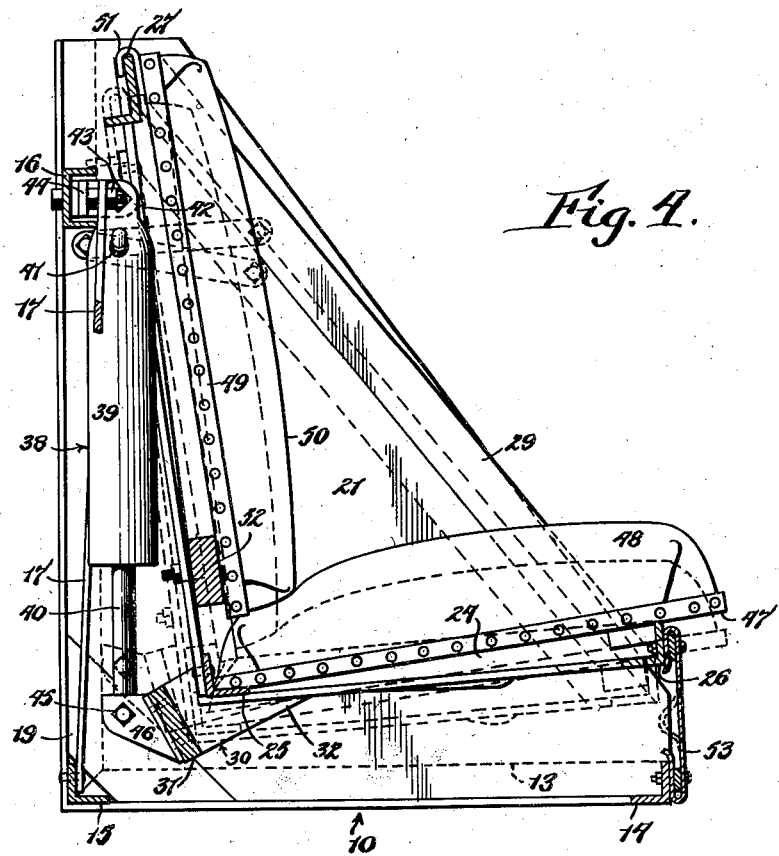
Fig. 4 is a transverse section taken generally on line 4—4, Fig. 1 and showing the seat and back pads in place.
Figure 5:
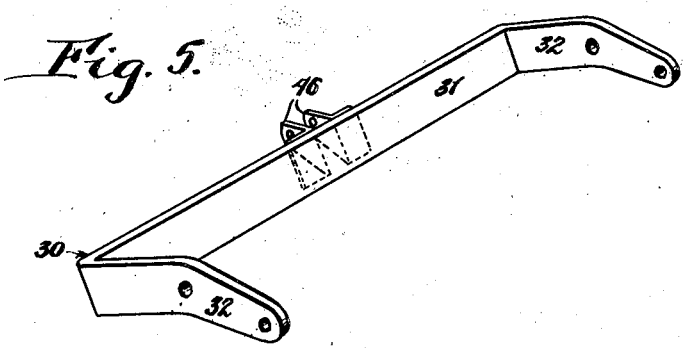
Fig. 5 is a perspective view of the cross bar or yoke which guides the lower end of the seat and also forms the connection between the seat and the air spring.

In its general organization this invention comprises a seat frame, a cross yoke which is pivotally carried by a sub-frame or the automobile body and supports the seat part of the seat frame for downward rearward movement and vice versa, a pair of links guiding the upper end of the back part of the seat for similar movement, and one or more air springs which are connected to the yoke and the sub-frame or vehicle frame and support the seat on a compressed body of air.

While in the drawings, the seat is shown as carried by a sub-frame, indicated generally at 10, it is obvious that the seat may also be carried directly on the vehicle frame, the five points of pivotal suspension of the seat being from the vehicle frame instead of the sub-frame.

Figure 2 shows a fragmentary section of a truck cab at the seat, the seat comprising a bed 11 and a back 12, this portion of the cab frame being made in any suitable manner and being shown as constructed of boards which rest on angle irons. Within the confines of this bed and back, the air supported seat embodying my invention is arranged.

The seat is shown as mounted in a sub-frame 10 which supports it and its air spring in such manner that the seat is exclusively supported on a cushion of compresssed air and is guided in its movements so that no jar or lurching of the seat occurs as the vehicle is driven over a rough roadway. This subframe 10 is shown as constructed of metal and includes end angle bars 13 which are bent to form the vertical and horizontal end members of the frame, and front and rear angle bars 14 and 15 which connect the front and rear ends of the horizontal parts of the end angle bars 13. A channel bar 16 extends across the back of the sub-frame, this channel bar 16 being secured at its ends to the vertical parts of the end angle bars 13 a short distance from their upper ends.

The back of the sub-frame is braced by a pair of flat metal truss members 17 each of which is secured at one end to the central part of the channel bar 16 and at its other end to the lower end of the vertical part of one of the angle bars 13, thereby holding the back of the sub-frame in rigid form. The back part of the sub-frame is also braced relative to the seat part thereof by an angle brace 19 at the corner of each of the end angle bars 13, and by a bar 20 which connects the vertical and horizontal parts of each of the end angle bars 13 intermediate of their ends. Each end of the sub-frame is also preferably enclosed by a sheet metal plate 21 which extends between the vertical and horizontal parts of each of the end angle bars 13 and is secured to these members and the angle braces 19 and bars 20 in any suitable manner. The edge of each of these end plates 21 is also preferably turned over as indicated at 22 to provide a smooth edge.

The seat frame is also made of metal and as best shown in Fig. 3 is composed of end vertical and horizontal angle bars 23 and 24 each pair being formed by bending the ends of a single angle bar into angular relation to one another, front and rear cross angle bars 25 and 26 connecting the front and rear ends of the horizontal end angle bars 24 and an angle bar 27 connecting the upper ends of the vertical end angle bars 23. The flange of the last named angle bar 27 projects rearwardly from the lower edge of the bar for a purpose which will presently appear.

The back of the seat frame is braced by a pair of diagonal truss strips 28 each of which is secured at its ends to the vertical end angle bar 23 and the rear lower cross bar 25 as best shown in Fig. 1. The back of the seat frame and the seat part thereof are also braced by a diagonal brace 29 which connects the outer ends of the vertical and horizontal end bars 23 and 24.

The seat frame as described is supported on a cushion of compressed air and is guided in its movement by means which preferably are constructed as follows:

The numeral 30 represents a yoke composed of a cross bar 31 of sufficient length to extend beyond the ends of the seat frame, and two arms 32 projecting forwardly from the cross bar 31.

The yoke 30 is arranged with its cross bar 31 across the back of the seat frame, and each of its arms 32 is pivoted intermediate its ends to the brace bar 20 of the sub-frame in any suitable manner, as indicated at 33. The front end of each of these arms is similarly pivoted to the lower end bars 24 of the seat frame as indicated at 34. The upper end of the seat frame is also guided by a pair of links 35, the front end of each of which is pivotally connected to the diagonal bar 29 as indicated at 36 and is pivotally connected at its rear end to the vertical part of the end angle bar 13 of the sub-frame as indicated at 37. It is therefore apparent when the seat frame is depressed that the link 35 will swing about its pivotal connections 36 and 37 and that the yoke 30 will swing about its pivotal connections 33 and 34, the cross bar 31 of the yoke being elevated on depressing the seat frame.

To provide a compressed air cushion for supporting the seat, an air spring 38 is provided. This air spring comprises an enclosed cylinder 39 within which is arranged a piston (not shown) connected to a piston rod 40. In the upper end of the cylinder a filling nipple 41 is provided, this filling nipple having the usual valve by which compressed air can be forced into the cylinder, but its escape is prevented. The piston and piston rod react against the body of compressed air in the cylinder, no spring or other cushioning devices being employed.

The upper end of the cylinder 39 of the air spring is formed to provide a pair of ears 42 which are connected by a bolt 43 with the forwardly projecting parts of a pair of brackets 44 on the sub-frame. In a similar manner, the outer end of the piston rod 40 is connected by a bolt 45 with a pair of brackets 46 on the yoke 30.

It is therefore apparent that when the driver sits down on the seat frame, it will be guided in its downward movement by the links 35 and arms 32, these members being so proportioned that the seat frame moves downwardly and slightly to the rear, but is maintained in the same position, thereby avoiding any lurch or uncomfortable movement of the seat frame. When the front ends of the arms 32 of the yoke are depressed by the weight of the user, the cross bar 31 is elevated and the piston rod 40 is moved up against the resistance of the body of compressed air in the cylinder 39. The weight of the user is thereby supported by the body of compressed air and when the vehicle is jolted around on rough roads, the seat frame, by reason of its cushioned support on the compressed air will have only a slight and retarded movement, thereby rendering the riding on the same entirely comfortable.

The seat frame is upholstered, the upholstering consisting of removable seat panels 47 which rest on the angle cross bars 25 and 26 and covered with padded upholstery 48, and removable back panels 49 covered with padded upholstery 50. The back panels or pads 49 are provided with hooks 51 at their upper ends which hook over the angle bar 27 and the lower ends of these back panels 49 rest against a wooden bar 52 which is bolted to the vertical end bars 23 of the seat frame. By this means both the seat and back pads can be conveniently removed when it is desired to oil the parts or recharge the cylinder 39 with compressed air and at the same time they are securely held in place while the seat is in use. The use of the wooden bar 52 also permits of conveniently changing the inclination of the back pads to suit the taste of the driver by using a thicker or thinner bar. To enclose the space between the seat frame and the sub-frame, a piece of flexible fabric or leather 53 is secured to the front bar 26 of the seat frame and the front bar 14 of the sub-frame, and can also be carried around the sides of the seat frame if desired.

As a whole this invention comprises a very simple and inexpensive air supported seat for vehicles which is so guided in its movement as to provide the maximum riding comfort and by reason of being supported wholly on a body of compressed air, completely cushions the shocks and jars and not only prevents relatively slight vibrations from being transmitted to the body of the driver, but also absorbs violent movements of the vehicle and prevents the driver from being thrown or jarred. The seat is also reliable in its operation and requires little servicing to keep it in good working condition.

I claim as my invention:

1. A seat including a supporting structure, a seat frame comprising a seat part and a back part, means for holding said seat part in fixed relation to said back part, cushioning means between said seat frame and said supporting structure and means for guiding said seat frame to move downwardly and rearwardly and vice versa comprising a horizontal link connected at its rear end to the supporting structure and at its front end to the seat frame adjacent the upper end of said back part and a second horizontal link connected at its rear end to said supporting structure and at its front end to the seat part of the seat frame.

2. A seat including a supporting structure, a seat frame comprising a seat part and a back part, means for holding said seat part in fixed relation to said back part, cushioning means between said seat frame and said supporting structure and means for guiding said seat frame to move downwardly and rearwardly and vice versa comprising a horizontal link connected at its rear end to the supporting structure and at its front end to the seat frame adjacent the upper end of said back part and a second horizontal link connected at its rear end to said supporting structure and at its front end to the seat part of the seat frame, the pivotal connections between said links and seat frame being in advance of their pivotal connections with the supporting structure.

3. A seat including a supporting structure, a seat frame comprising a seat part and a back part, cushioning means between said seat frame and said supporting structure and means for guiding said seat frame to move downwardly and rearwardly and vice versa comprising a horizontal link connecting the supporting structure and the seat frame adjacent the upper end of said back part and a second horizontal link connecting said supporting structure and the seat part of the seat frame, the distance center to center, between the pivotal connections of said links being substantially the same.

4. A seat including a supporting structure, a seat frame comprising a seat part and a back part, cushioning means between said seat frame and said supporting structure, and means for guiding said seat frame to move downwardly and rearwardly and vice versa comprising a pair of extensions projecting forwardly from the opposite sides of said back part adjacent the upper end thereof, a link pivotally connected at its front end to each of said extensions and pivotally connected at its rear end to said supporting structure, and a second pair of links connected at their front ends to the opposite sides of the seat part of said seat frame and at their rear ends to said supporting structure.

5. A seat including a supporting structure, a seat frame comprising a seat part and a back part, means for holding said seat part in fixed relation to said back part, rising from said seat part, means for guiding said seat frame to move downwardly and rearwardly and vice versa comprising an upper horizontal vertically swinging link pivotally connected at its front end to said back part and at its rear end to the supporting structure, a second horizontal vertically swinging link pivotally connected at its front end to said seat part and at its rear end to the supporting structure and a spring pivotally connecting one of said links and said supporting structure and arranged to resist the downward movement of said seat frame.

6. A seat including a supporting structure, a seat frame comprising a seat part and a back part rising from said seat part, means for guiding said seat frame to move downwardly and rearwardly and vice versa comprising an upper horizontal vertically swinging link pivotally connecting said back part and the supporting structure, a second horizontal vertically swinging link pivotally connecting said seat part and the supporting structure and a spring arranged in rear of said seat frame and pivotally connecting the lower link and said supporting structure and arranged to resist the downward movement of said seat frame.

7. A seat including a supporting structure, a seat frame comprising a seat part and a back part rising from said seat part, means for guiding said seat frame to move downwardly and rearwardly and vice versa comprising an upper horizontal vertically swinging link pivoted at its front end to said back part and at its rear end to the supporting structure, a lower horizontal vertically swinging link pivoted at its front end to said seat part and pivoted intermediate its ends to said supporting structure, and a spring connecting the rear end of said lower link and said seat frame and arranged to resist the downward movement of said seat frame.

8. A seat including a supporting structure, a seat frame comprising a seat part and a back part, rising from said seat part, means for guiding the upper part of said seat frame to move downwardly and rearwardly and vice versa and means for guiding the lower part of said seat frame to move downwardly and rearwardly and vice versa comprising a yoke arranged in rear of said seat and having its arms projecting forwardly on opposite sides of said seat frame, means pivotally connecting the front ends of said arms with said seat frame, means pivotally connecting the intermediate parts of said arms and said supporting structure and a spring pivotally connecting the rear part of said yoke and said supporting structure and arranged to resist the downward movement of the seat frame.

9. A seat including a supporting structure, a seat frame comprising a seat part and a back part rising from said seat part, means for guiding the upper part of said seat frame to move downwardly and rearwardly and vice versa and means for guiding the lower part of said seat frame to move downwardly and rearwardly and vice versa comprising a yoke arranged in rear of said seat and having its arms projecting forwardly on opposite sides of said seat frame, means pivotally connecting the front ends of said arms with said seat frame, means pivotally connecting the intermediate parts of said arms and said supporting structure and a spring pivotally connected at its lower end to the rear part of said yoke and at its upper end to said supporting structure in rear of said seat frame, said spring being arranged to resist the upward movement of the rear end of said yoke and thereby resist the downward movement of said seat frame.

10. A seat including a sub-frame having a bed, a back rising from said bed and sides rising from said bed and connected to said back, a seat frame comprising a seat part, a back part rising from said seat part and sides extending forwardly from said back part, means for guiding said seat frame to move downwardly and rearwardly relative to said sub-frame and vice versa comprising a pair of links connecting the upper part of the back part of said sub-frame with the sides of said seat frame and a yoke arranged between the back part of said sub-frame and the back part of said seat frame, said yoke having forwardly projecting arms pivotally connected intermediate their ends to the sides of said sub-frame and pivotally connected at their front ends to the sides of the seat part of said seat frame and a spring for resisting the downward movement of said seat frame comprising a cylinder pivotally connected to the upper part of the back part of said sub-frame and a piston and piston rod pivotally connected to said yoke intermediate said arms.

In testimony whereof I hereby affix my signature.

ALBERT F. HICKMAN.